(12) United States Patent
Ohara

(10) Patent No.: US 9,065,659 B2
(45) Date of Patent: Jun. 23, 2015

(54) COMMUNICATION DEVICE

(75) Inventor: Kiyotaka Ohara, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 217 days.

(21) Appl. No.: 13/179,951

(22) Filed: Jul. 11, 2011

(65) Prior Publication Data

US 2012/0016813 A1    Jan. 19, 2012

(30) Foreign Application Priority Data

Jul. 14, 2010    (JP) ................................ 2010-160040

(51) Int. Cl.
| | | |
|---|---|---|
| G06Q 10/00 | (2012.01) | |
| G06Q 30/00 | (2012.01) | |
| H04L 12/14 | (2006.01) | |
| G06Q 30/02 | (2012.01) | |
| H04N 1/34 | (2006.01) | |
| G07F 19/00 | (2006.01) | |
| H04M 15/00 | (2006.01) | |
| G06F 17/00 | (2006.01) | |
| G06G 7/00 | (2006.01) | |
| H04N 1/00 | (2006.01) | |

(52) U.S. Cl.
CPC ............ *H04L 12/14* (2013.01); *G06Q 30/0283* (2013.01); *H04L 12/1421* (2013.01); *H04L 12/1428* (2013.01); *H04L 12/1485* (2013.01); *H04N 1/00217* (2013.01); *H04N 1/34* (2013.01); *H04N 2201/3335* (2013.01); *H04N 2201/0094* (2013.01)

(58) Field of Classification Search
CPC ........................ G06Q 30/0283; G06Q 10/067
USPC ................... 705/1.1, 7.35, 400; 370/235–238
See application file for complete search history.

(56) References Cited

U.S. PATENT DOCUMENTS

| | | | |
|---|---|---|---|
| 6,456,594 B1 * | 9/2002 | Kaplan et al. ................. | 370/238 |
| 6,512,761 B1 | 1/2003 | Schuster et al. | |
| 6,563,517 B1 * | 5/2003 | Bhagwat et al. .............. | 715/735 |
| 2004/0125793 A1 * | 7/2004 | Yi et al. ........................ | 370/352 |

(Continued)

FOREIGN PATENT DOCUMENTS

| | | |
|---|---|---|
| CN | 1235729 A | 11/1999 |
| EP | 1109 369 A2 | 6/2001 |

(Continued)

OTHER PUBLICATIONS

Yada, Koji, machine translation of JP2003224588, published Aug. 8, 2003, translation perforemd Sep. 5, 2014.*

(Continued)

*Primary Examiner* — George Chen
(74) *Attorney, Agent, or Firm* — Scully, Scott, Murphy & Presser, P.C.

(57) ABSTRACT

A communication device includes: a communication unit that is configured to execute communication of data according to one of a plurality of bandwidth guarantees with different communication charges per time unit; and a selection unit that is configured to select a first bandwidth guarantee with the lowest communication charges required for communication of specific data, among the plurality of bandwidth guarantees, using a data size of the specific data when the communication of the specific data is to be executed, wherein the communication of the specific data is executed according to the selected first bandwidth guarantee.

7 Claims, 6 Drawing Sheets

(56) References Cited

U.S. PATENT DOCUMENTS

| | | | |
|---|---|---|---|
| 2005/0265370 A1* | 12/2005 | Fuente et al. | 370/412 |
| 2008/0049748 A1* | 2/2008 | Bugenhagen et al. | 370/389 |
| 2008/0225832 A1* | 9/2008 | Kaplan et al. | 370/352 |
| 2010/0134828 A1* | 6/2010 | Nishiyama | 358/1.15 |
| 2010/0278046 A1* | 11/2010 | Mateos Perez et al. | 370/235 |

FOREIGN PATENT DOCUMENTS

| | | |
|---|---|---|
| EP | 1 758314 A1 | 2/2007 |
| JP | 9-200298 | 7/1997 |
| JP | 2000-244486 | 9/2000 |
| JP | 2001-127756 | 5/2001 |
| JP | 2003-224588 A | 8/2003 |

OTHER PUBLICATIONS

David K. Goldenberg, "Optimizing Cost and Performance for Multihoming", Session 3: Multihoming and Overlays, ACM, New York, Sep. 3, 2004, pp. 79-92.

Extended European Search Report dated Nov. 3, 2011 from related EP Application No. 11173474.5.

European Office Action dated Apr. 30, 2013 from corresponding European Patent Application No. 11 173 474.5.

Chinese Official Action dated Aug. 16, 2013 received from the Chinese Patent Office in related application 201110199265.5 together with English translation.

Japanese Office Action dated Nov. 12, 2013 from related Japanese Patent Application No. 2010-160040, together with an English language translation.

\* cited by examiner

COMMUNICATION DEVICE

CROSS-REFERENCE TO RELATED APPLICATIONS

This application claims priority from Japanese Patent Application No. 2010-160040 filed on Jul. 14, 2010, the entire subject matter of which is incorporated herein by reference.)

TECHNICAL FIELD

The present invention relates to a communication device which executes data communication according to one of a plurality of bandwidth guarantees.

BACKGROUND

There has been proposed a technique disclosing a terminal device which executes a plurality of communication applications (for example, IP FAX or email). The terminal device executes data communication using one of a plurality of packet networks based on different communication charges per unit packet. The terminal device uses a packet network with the lowest communication charges per unit packet when executing a specific communication application. According to the related-art technique, communication charges corresponding to the amount of data packets which were actually transmitted are imposed on a terminal device. This accounting system will now be called a "packet-based accounting system".

SUMMARY

Instead of the above-described packet-based accounting system, an accounting system which imposes the communication charges corresponding to a time required for data communication on a terminal device may be adopted. This accounting system will now be called a "time-based accounting system". In this time-based accounting system, a communication time of each bandwidth guarantee required for communication of specific data depends on the data size of specific data. As a result, the communication charges of each bandwidth guarantee required for communication of the specific data depends on the data size of the specific data. For this reason, even when a specific communication application is executed, a bandwidth guarantee with the lowest communication charges changes according to the data size of communication data.

Illustrative aspects of exemplary embodiments of the present invention provide a technique capable of executing data communication according to a bandwidth guarantee with the lowest communication charges when the time-based accounting system is adopted.

According to one illustrative aspect of the invention, there is provided a communication device comprising: a communication unit that is configured to execute communication of data according to one of a plurality of bandwidth guarantees with different communication charges per time unit; and a selection unit that is configured to select a first bandwidth guarantee with the lowest communication charges required for communication of specific data, among the plurality of bandwidth guarantees, using a data size of the specific data when the communication of the specific data is to be executed, wherein the communication of the specific data is executed according to the selected first bandwidth guarantee.

According thereto, the communication device may select the first bandwidth guarantee with the lowest communication charges appropriately in order to execute the above-described selection using the data size of the specific data. Therefore, when the time-based accounting system is adopted, the communication device may execute communication of the specific data according to the bandwidth guarantee with the lowest communication charges.

In addition, a control method for the above-described communication device, a computer program for the above-described communication device and a non-transitory computer-readable medium which stores the computer program, and a communication method in a network adopting a time-based accounting system, in which accounting of communication according to each bandwidth guarantee is executed according to communication charges per time unit, are also novel and useful.

DETAILED DESCRIPTION

First Exemplary Embodiment

Configuration of a System

Figure 1:
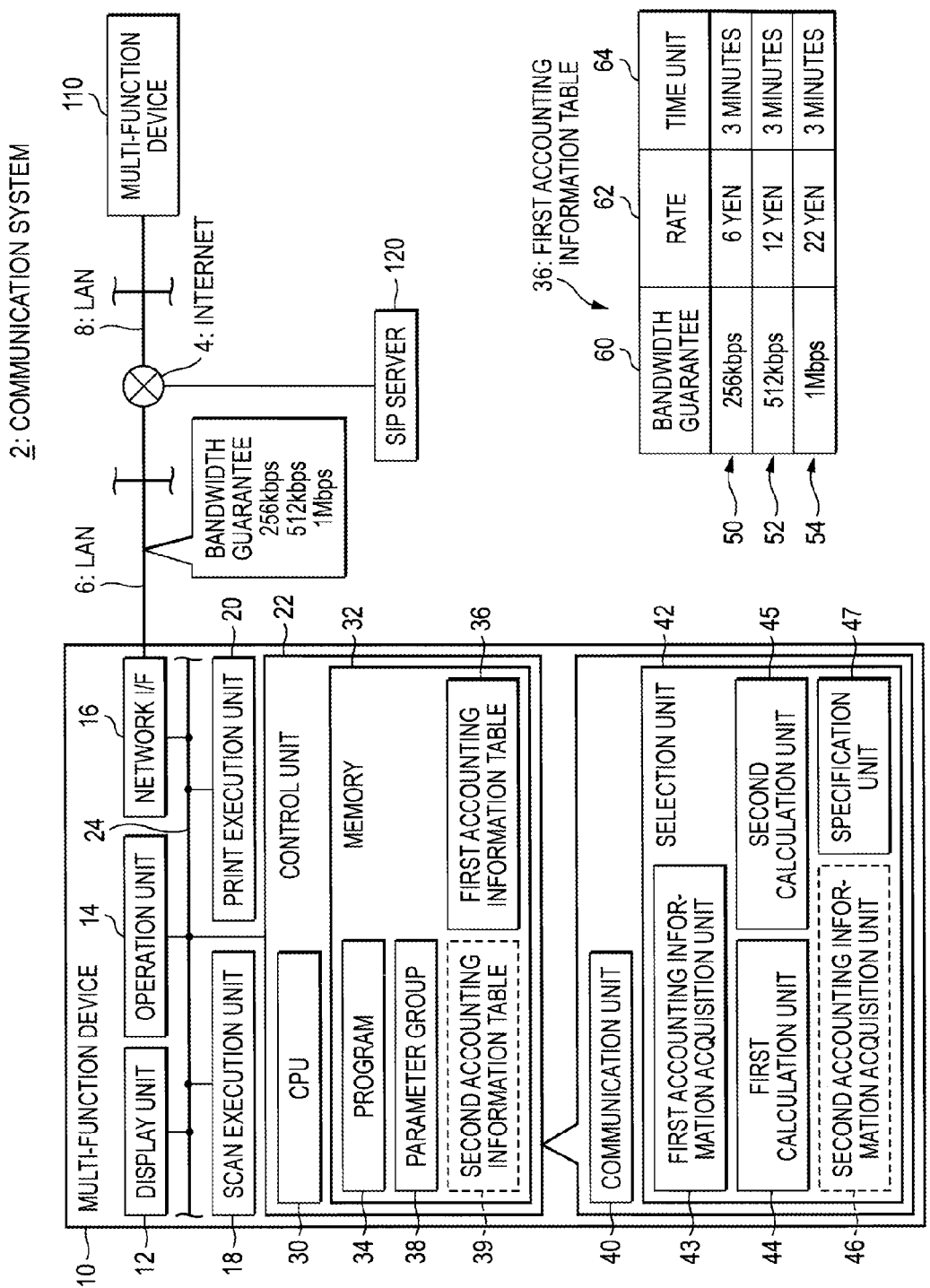
FIG. 1 shows an example of the configuration of a communication system in a first exemplary embodiment.

A first exemplary embodiment will be described with reference to the drawings. As shown in FIG. 1, a communication system 2 includes the Internet 4, LANs 6 and 8, multi-function devices 10 and 110, and an SIP (Session Initiation Protocol) server 120. The multi-function device 10 is connected to the LAN 6. The multi-function device 110 is connected to the LAN 8. The LANs 6 and 8 and the SIP server 120 are connected to the Internet 4. The multi-function device 10, the SIP server 120, and the multi-function device 110 can communicate with each other through the LANs 6 and 8 and the Internet 4.

(Configuration of the Multi-Function Device 10)

The configuration of the multi-function device 10 will be described. Incidentally, the multi-function device 110 has the same configuration as the multi-function device 10. The multi-function device 10 has various functions, such as a print function, a scanner function, a copy function, email transmission and reception functions, an IP FAX function, and a telephone function. The multi-function device 10 includes a display unit 12, an operation unit 14, a network I/F 16, a scan execution unit 18, a print execution unit 20, and a control unit 22. Each of the units 12 to 22 described above is connected to a bus line 24. The display unit 12 is a display device for displaying various kinds of information. The operation unit 14 is formed by a plurality of keys. A user can input various instructions to the multi-function device 10 by operating the operation unit 14. The network interface 16 is connected to the LAN 6. The scan execution unit 18 has a scanning mechanism, such as a CIS or a CCD, and generates the image data by scanning an object to be scanned. The print execution unit 20 includes a printing mechanism, which is of an ink jet head type, a laser type, or the like, and performs printing in response to an instruction from the control unit 22.

The control unit 22 includes a CPU 30 and a memory 32. The memory 32 stores a program 34, a first accounting information table 36, and a parameter group 38. Incidentally, although the memory 32 includes a second accounting information table 39 as shown by a dotted line in FIG. 1, this second accounting information table 39 is used in a second exemplary embodiment (which will be described later). The CPU 30 executes processing according to the program 34 stored in the memory 32. Functions of a communication unit 40 and a selection unit 42 are realized when the CPU 30 executes processing according to the program 34.

The communication unit 40 executes communication of FAX data according to one of three bandwidth guarantees (256 kbps, 512 kbps, and 1 Mbps). The size of data which can be transmitted per time unit (one second) differs with each bandwidth guarantee. For example, the bandwidth guarantee "256 kbps" means that data of 256 kilobit can be transmitted per second. The larger the size of the data which can be transmitted per second, the faster is the communication speed. That is, the communication speed differs with each bandwidth guarantee. The term of bandwidth guarantee may be expressed as "QoS (Quality of Service)". In addition, the selection unit 42 includes a first accounting information acquisition unit 43, a first calculation unit 44, and a second calculation unit 45. Incidentally, although the selection unit 42 includes a second accounting information acquisition unit 46 and a specification unit 47 as shown by a dotted line in FIG. 1, the second accounting information acquisition unit 46 and the specification unit 47 are used in the second exemplary embodiment which (will be described later).

The first accounting information table 36 includes three items of combination information 50, 52, and 54. Each item of combination information 50, 52, and 54 is information in which information 60 indicating a bandwidth guarantee (for example, "256 kbps"), a rate 62 (for example, "6 yen"), and a time unit 64 (for example, "3 minutes") are associated with each other. The information 60 indicating a bandwidth guarantee shows the above-described three bandwidth guarantees (256 kbps, 512 kbps, and 1 Mbps) with which the communication unit 40 can perform communication. The rate 62 and the time unit 64 show communication charges per time unit which is required when the communication unit 40 performs communication according to the bandwidth guarantee shown in the information 60 indicating a bandwidth guarantee. For example, the combination information 50 indicates that communication charges of 6 yen are required every three minutes when the communication unit 40 executes communication according to the bandwidth guarantee "256 kbps". The first accounting information table 36 is stored in advance in the memory 32 by the vendor of the multi-function device 10 before shipping of the multi-function device 10.

Figure 2:
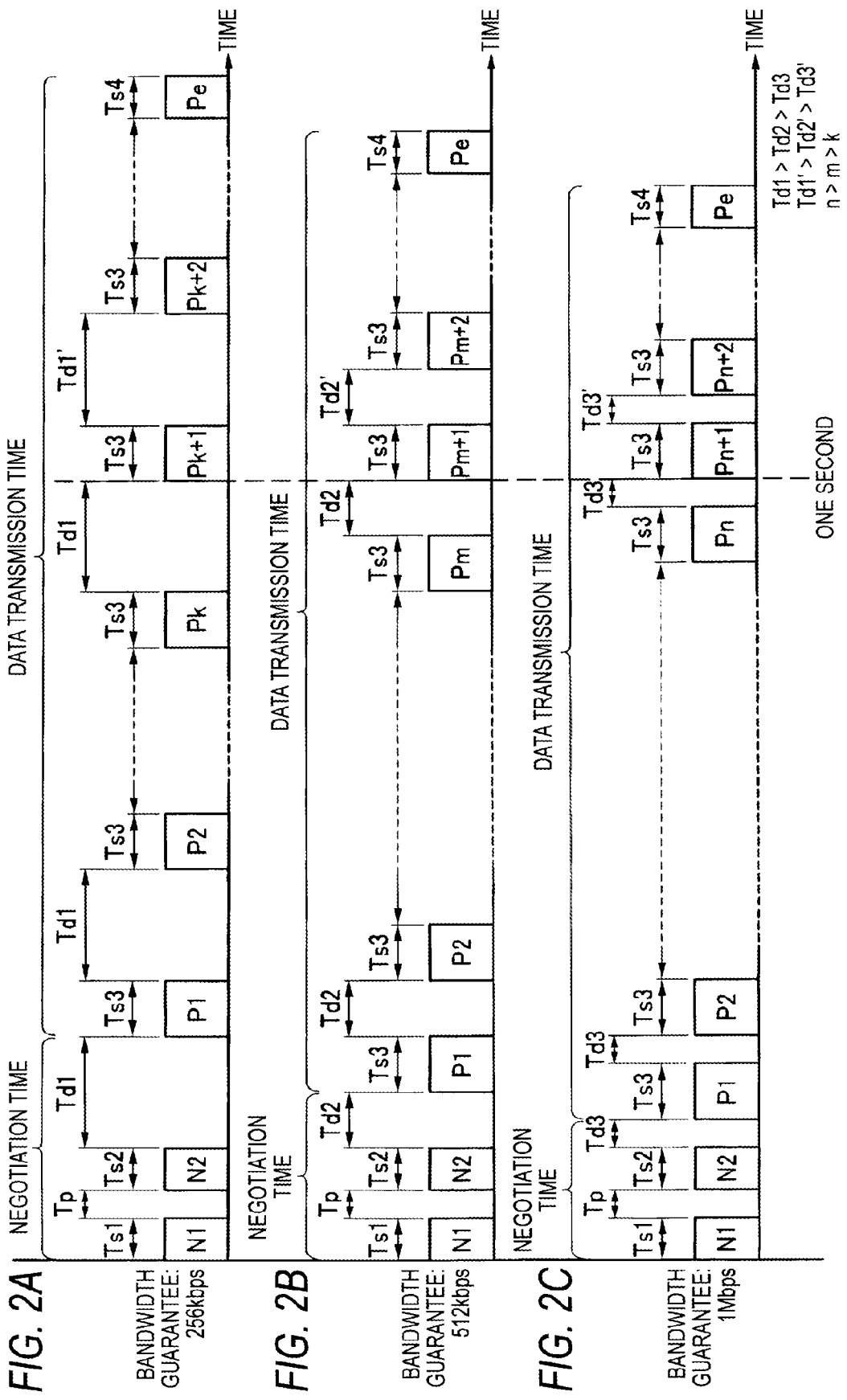
FIGS. 2A to 2C show time charts when transmitting FAX data according to each bandwidth guarantee.

The parameter group 38 stores the information for calculating communication charges which are required when the multi-function device 10 performs communication of FAX data according to each bandwidth guarantee. Specifically, the parameter group 38 stores data sizes D1 and D2 of negotiation information N1 and N2 (refer to FIGS. 2A to 2C) required for negotiation communication that is performed before starting communication of FAX data, the data size D3 of partial FAX data Px (x is an integer of 1 or more. Refer to FIGS. 2A to 2C), which is equivalent to one packet, of the transmitted FAX data, and a processing time Tp for a device at the transmission destination. In addition, one parameter group 38 also stores a predetermined function indicating the relationship between the data size and a communication time which is required when the multi-function device 10 performs communication of the data with the data size. Incidentally, in the present exemplary embodiment, two types of data (N1 and N2) are mentioned as data required for negotiation communication. However, when communication of more types of data is required in negotiation communication, the parameter group 38 stores data sizes of all types of data required for the negotiation communication. In addition, the parameter group 38 is stored in advance in the memory 32 by the vendor of the multi-function device 10 before shipping of the multi-function device 10.

Each item of the negotiation information N1 and N2 is data of one packet. The data sizes D1 and D2 of the negotiation information N1 and N2 are values set in advance. The data size D3 of the partial FAX data Px is a value set in advance as the size of data which can be transmitted according to the bandwidth guarantee with a lowest communication speed (in the present exemplary embodiment, 256 kbps), among the three bandwidth guarantees (that is, a predetermined size (for example, 512 bytes) equal to or smaller than 256 kbps per packet). In the case of communication of FAX data with a larger data size than D3 (one packet), the communication unit 40 divides the FAX data into a plurality of packets whose data sizes per packet are D3 and transmits the divided packets.

The processing time Tp is a time required for processing (for example, generation of data) until a device, which has received one packet data, starts a response. A value found in advance (for example, an average value of a time required for various kinds of processing) is adopted as the processing time Tp. This processing time Tp does not depend on the communication speed of each bandwidth guarantee. For this reason, each processing time Tp corresponding to each bandwidth guarantee is the same. The predetermined function is a function indicating the relationship between the data size and a communication time required when the multi-function device 10 performs communication of the data with the data size. The predetermined function is a function set in advance according to the communication capability of the multi-function device 10. For this reason, the predetermined function does not change according to the communication speed of each bandwidth guarantee. Accordingly, the first calculation unit 44 (refer to FIG. 1) can calculate, for example, a communication time Ts1 for executing communication of the packet data N1 with the data size D1 using the predetermined function. Details of the calculation by the first calculation unit 44 will be described later. Similarly, the first calculation unit 44 can calculate a communication time Ts2 for executing communication of the packet data N2 and a communication time Ts3 for executing communication of the partial FAX data Px.

As described above, the size of data which can be transmitted per time unit is determined in advance according to each bandwidth guarantee. For example, when executing communication according to the bandwidth guarantee "256 kbps", it is possible to execute data communication of maximum 256 kilobit for one second. Accordingly, the first calculation unit 44 can specify the type and number of packet data, which can be transmitted per time unit according to a bandwidth guarantee when executing communication, from the data size (for example, D1, D2, or D3) of packet data transmitted.

(Configuration of the SIP Server 120)

The configuration of the SIP server 120 will be described. The SIP server 120 stores, for each of the multi-function devices 10 and 110, an IP address of the corresponding multi-function device and SIPURI of the corresponding multi-function device with associating the IP address with the SIPURI of the corresponding multi-function device. The SIP server 120 establishes a communication session between the multi-function devices 10 and 110 using an SIP (Session Initiation Protocol). That is, for example, various commands for establishing a communication session for executing IP FAX transmission processing between the multi-function devices 10 and 110 are transmitted through the SIP server 120.

(Example of Communication of FAX Data)

Figure 3:
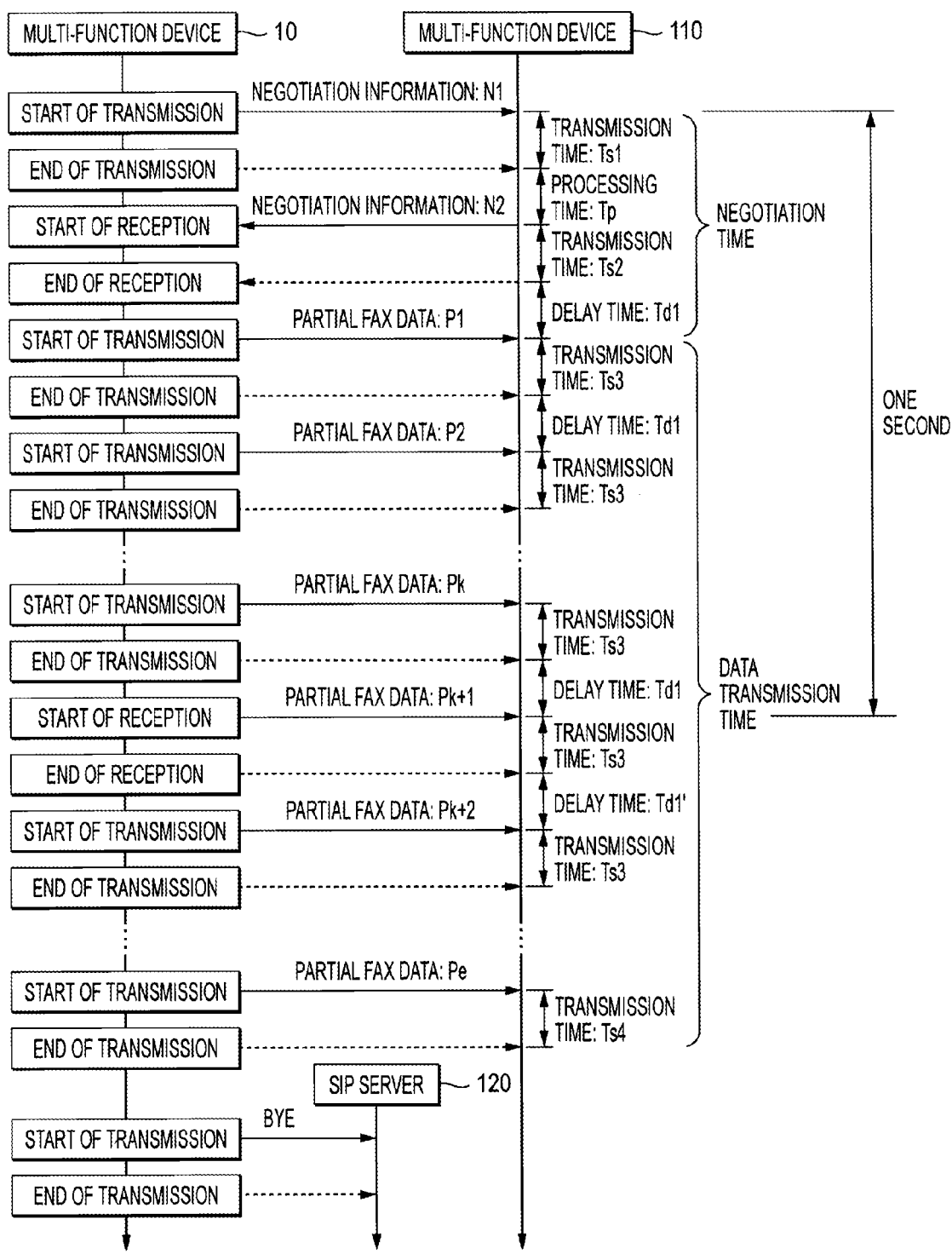
FIG. 3 shows a situation where FAX data is transmitted between a pair of multi-function devices.

FIGS. 2A to 2C and 3 show an example of processing that each of the multi-function devices 10 and 110 executes in order to transmit the FAX data from the multi-function device 10 to the multi-function device 110. In FIG. 3, the case where the communication unit 40 of the multi-function device 10 transmits FAX data according to a bandwidth guarantee "256 kbps" will be described as an example. Moreover, in FIG. 2A, the case where the total data size (D1+D2+k×D3) of the negotiation information N1 and N2 and "k" (k is an integer of 1 or more) partial FAX data P1 to Pk is smaller than 256 kilobit but the total data size (D1+D2+(k+1)×D3) of the negotiation information N1 and N2 and "(k+1)" partial FAX data P1 to Pk+1 is larger than 256 kilobit will be described as an example. Therefore, in this example, the data which can be transmitted for one time unit (hereinafter, may be referred to as "first second") from establishment of a communication session is the negotiation information N1 and N2 and the partial FAX data P1 to Pk (refer to FIGS. 2A and 3). Each item of partial FAX data from the partial FAX data Pk+1 is transmitted from the next time unit (hereinafter, may be referred to as "second second").

When communication of a predetermined command is executed through the SIP server 120 between the multi-function devices 10 and 110, a communication session is established between the multi-function devices 10 and 110. When the communication session is established, each processing in FIG. 3 is started. When the communication unit 40 transmits FAX data to the multi-function device 110, the communication unit 40 transmits the negotiation information N1 to the multi-function device 110 first. The negotiation information N1 is various kinds of information regarding the transmission of FAX data. For example, the negotiation information N1 is the resolution of FAX data, the number of colors, and a data format (for example, jpeg or tiff). As described above, the negotiation information N1 is one item of packet data whose data size is D1. The time (transmission time) required until the communication unit 40 ends transmission of negotiation information 200 from the start of transmission of the negotiation information 200 is Ts1.

When the multi-function device 110 receives the negotiation information N1, the multi-function device 110 generates the negotiation information N2 corresponding to the negotiation information N1 and transmits the negotiation information N2 to the multi-function device 10. The negotiation information N2 includes responses to various kinds of information included in the negotiation information N1. Specifically, the negotiation information N2 includes: information indicating that data with a resolution indicated by the negotiation information N1 can be printed (or cannot be printed); information indicating that printing (or color printing) using the number of colors indicated by the negotiation information N1 is possible (or impossible); and information indicating that printing based on the data format indicated by the negotiation information N1 is possible (or impossible), for example.

As described above, the time (processing time) required when the multi-function device 110 generates the negotiation information N2 is Tp. In addition, the negotiation information N2 is one item of packet data whose data size is D2. The time (reception time) required until the communication unit 40 ends reception of negotiation information 202 from the start of reception of the negotiation information 200 is Ts2. The time (delay time) required until the communication unit 40 transmits one item of packet data (partial FAX data P1) after receiving the negotiation information N2 is Td1. The delay time is a waiting time until the next packet data (partial FAX data P1) is transmitted after one item of packet data (for example, the negotiation information N2) is transmitted. The delay time may also be called a waiting time between communications of two continuous items of packet data. The method of calculating the delay time Td1 will be described later. After elapse of the delay time Td1, the negotiation communication ends. Incidentally, the time (Ts+Tp+Ts+Td1) required for negotiation communication is hereinafter called a "negotiation time".

After the above-described negotiation communication ends, the communication unit 40 transmits the partial FAX data P1, which is one item of packet data, to the multi-function device 110. The time (transmission time) required until transmission of the partial FAX data P1 ends from the start of transmission of the partial FAX data P1 is Ts3. After transmitting the partial FAX data P1, the communication unit 40 transmits the next one item of partial FAX data P2 after elapse of the delay time Td1. Similarly, the communication unit 40 transmits partial FAX data P3 (not shown), P4 (not shown), . . . , Pk sequentially. In FIGS. 2A and 3, the delay time Td1 occurs at every timing of transmission of each item of data. That is, the delay time Td1 occurs for a period until the partial FAX data P1 is transmitted after the negotiation information N2 is received, and then the delay time Td1 occurs after transmission of partial FAX data. That is, the delay time Td1 occurs (k+1) times for one second from establishment of a communication session. In other words, one second from establishment of a communication session is a total time of the transmission time Ts1 of the negotiation information N1, the processing time Tp, the reception time Ts2 of the negotiation information N2, the transmission time (k×Ts3) of each item of the partial FAX data P1 to Pk, and the delay time ((k+1)×Td1) occurring for each transmission of each item of data. That is, the total delay time ((k+1)×Td1) occurring in this time unit (first second) is a time excluding (Ts1+Ts2+k×Ts3) from one second. Each delay time Td1 is a result value obtained by dividing the total delay time ((k+1)×Td1) by (k+1).

The communication unit 40 transmits the remaining partial FAX data Pk+1, . . . , Pe from the next time unit (second second). From the second second, after transmitting the partial FAX data Pk+1, the communication unit 40 transmits the next one item of partial FAX data Pk+2 after elapse of a delay time Td1'. Since negotiation communication is not performed from the second second, the number of partial FAX data which can be transmitted per time unit is calculated from the data size D3 of partial FAX data. For example, when the number of partial FAX data which can be transmitted per time unit is α, the total delay time (α×Td1') occurring in this time unit (the second second) is a time excluding α×Ts3 from one second. Each delay time Td1' is a result value obtained by dividing the total delay time (α×Td1') by α. The delay time Td1' is a different time from the delay time Td1. The partial FAX data Pe shown in FIG. 2A is the last one item of partial FAX data. For example, if the data size of the last one item of partial FAX data Pe is a size D4 that is smaller than D3, a transmission time of the partial FAX data Pe is Ts4. On the other hand, if the data size of the last one item of partial FAX data Pe is the data size D3, a transmission time of the partial FAX data Pe is Ts3. Incidentally, a time required until the last one item of partial FAX data Pe is transmitted from the start of transmission of the first one item of partial FAX data P1 is hereinafter called a "data transmission time".

After transmission of the last partial FAX data Pe ends, the communication unit 40 transmits BYE to the multi-function device 110 through the SIP server 120. BYE is a command for ending the communication session established between the multi-function devices 10 and 110. The communication charges required for communication between the multi-function devices 10 and 110 is determined according to a time until BYE is transmitted from establishment of the communication session. In addition, since the communication unit 40 transmits BYE to the SIP server 120 immediately after the end of transmission of the last partial FAX data Pe, the communication charges required for communication between the multi-function devices 10 and 110 is actually determined according to a time required until the last one item of partial FAX data Pe is transmitted from establishment of the communication session. Incidentally, when the multi-function device 110 receives BYE through the SIP server 120, the multi-function device 110 generates 200 OK which is a response to BYE and transmits 200 OK to the multi-function device 10. When the communication unit 40 receives 200 OK, the communication session between the multi-function devices 10 and 110 ends, and communication between the multi-function devices 10 and 110 ends accordingly.

In the above example, the case has been described in which the communication unit 40 of the multi-function device 10 transmits the FAX data according to the bandwidth guarantee "256 kbps". The processing executed by the communication unit 40 of the multi-function device 10 is almost the same as in cases of transmitting the FAX data according to bandwidth guarantees "512 kbps" and "1 Mbps".

In FIG. 2B, the total data size (D1+D2+m×D3) of the negotiation information N1 and N2 and "m" (m>k, m is an integer of 2 or more) partial FAX data P1 to Pm is smaller than 512 kb, but the total data size (D1+D2+(m+1)×D3) of the negotiation information N1 and N2 and "(m+1)" partial FAX data P1 to Pm+1 is larger than 512 kb. Accordingly, the communication unit 40 can transmit the negotiation information N1 and N2 and "m" partial FAX data P1 to Pm for one second from establishment of the communication session. The method of calculating the delay time Td2 and Td2' is the same as the method described above. Also in the case shown in FIG. 2B, the transmission time Ts1, Ts2, and Ts3 and the processing time Tp are the same as those in the case of 256 kbps. On the other hand, in the case shown in FIG. 2B, the number of partial FAX data which can be transmitted per time unit is larger than that in the case of bandwidth guarantee "256 kbps" (m>k). Accordingly, the delay time Td2 and Td2' in the bandwidth guarantee "512 kbps" is shorter than the delay time Td1 and Td1' in the bandwidth guarantee "256 kbps".

Moreover, in FIG. 2C, the total data size (D1+D2+n×D3) of the negotiation information N1 and N2 and "n" (n>m, n is an integer of 3 or more) partial FAX data P1 to Pn is smaller than 1 Mb, but the total data size (D1+D2+(n+1)×D3) of the negotiation information N1 and N2 and "(n+1)" partial FAX data P1 to Pn+1 is larger than 1 Mb, similar to those described above. In addition, the delay time Td3 and Td3' is calculated using the same method as the above-described method. The delay time Td3 and Td3' in the bandwidth guarantee "1 Mbps" is shorter than the delay time Td1 and Td1' in the bandwidth guarantee "256 kbps" and the delay time Td2 and Td2' in the bandwidth guarantee "512 kbps". That is, since a larger amount of data can be transmitted per time unit as a bandwidth guarantee becomes large, a delay time becomes shorter as the bandwidth guarantee becomes large (refer to FIGS. 2A to 2C).

(IP FAX Transmission Processing)

Next, IP FAX transmission processing will be described with reference to FIGS. 4 and 5. Hereinafter, IP FAX transmission processing will be described using as an example the case where the multi-function device 10 transmits FAX data to the multi-function device 110.

The control unit 22 monitors whether or not an IP FAX transmission operation is executed (S40). The user of the multi-function device 10 can set a document on an automatic document feeder (not shown) and execute the IP FAX transmission operation using the operation unit 14 in that state. The IP FAX transmission operation includes an operation of inputting SIPURI of the multi-function device 110 which is a transmission destination of the FAX. The communication unit 40 performs determination of YES in step S40 when the IP FAX transmission operation is executed.

If YES in step S40, the communication unit 40 acquires FAX data (S42). Specifically, the communication unit 40 makes the scan execution unit 18 scan the document set on the automatic document feeder. Then, the scan execution unit 18 generates the scan data. The communication unit 40 acquires FAX data by acquiring the scan data from the scan execution unit 18. Then, the communication unit 40 acquires SIPURI of the transmission destination (that is, SIPURI of the multi-function device 110) designated by the user (S44). Then, the selection unit 42 (refer to FIG. 1) executes bandwidth guarantee selection processing (S46).

This bandwidth guarantee selection processing will be described in detail with reference to FIG. 5. At the start of the bandwidth guarantee selection processing, the selection unit 42 clears a temporary table in the memory 32 (S80). Then, the selection unit 42 specifies the data size of the FAX data (hereinafter, referred to as "specific FAX data") acquired in step S42 of FIG. 4 (S82). Then, the selection unit 42 specifies one bandwidth guarantee (hereinafter, referred to as a "specific bandwidth guarantee") of the three bandwidth guarantees (256 kbps, 512 kbps, and 1 Mbps) (S84).

Then, the first calculation unit 44 (refer to FIG. 1) calculates an estimated communication time when transmitting the specific FAX data to the multi-function device 110 according to the specific bandwidth guarantee (S86). Specifically, the first calculation unit 44 calculates a total time of the negotiation time and the data transmission time using the parameter group 38 and the data size specified in step S82. Next, the method for calculating each time will be described.

First, the first calculation unit 44 specifies the data sizes D1, D2, and D3 of the negotiation information N1 and N2 and the partial FAX data Px from the parameter group 38. The first calculation unit 44 calculates the transmission time Ts1 of the negotiation information N1, the reception time Ts2 of the negotiation information N2, and the transmission time Ts3 of the partial FAX data P1 using the data sizes D1, D2, and D3 and the predetermined function. In addition, the first calculation unit 44 specifies the processing time Tp from the parameter group 38. In addition, the first calculation unit 44 calculates a delay time (Td1, Td2, or Td3; hereinafter, referred to as a "delay time Td") for one second from establishment of the communication session, which corresponds to the specific bandwidth guarantee described above. The method of calculating the delay time Td is the same as the method described above. The first calculation unit 44 calculates a negotiation time by calculating the sum of Ts1, Tp, Ts2, and Td.

In addition, the first calculation unit 44 calculates the number (hereinafter, referred to as "N") of packet data (partial FAX data), which is required for transmitting all items of the specific FAX data, by dividing the data size specified in step S82 by the data size D3 of the partial FAX data Px. In addition, the first calculation unit 44 calculates a delay time (Td1', Td2', or Td3'; hereinafter, referred to as a "delay time Td'") from the second second, which corresponds to the specific bandwidth guarantee described above. The method of calculating the delay time Td' is the same as the method described above. In addition, the first calculation unit 44 specifies the data size D4 of the last partial FAX data Pe and calculates the transmission time Ts4 of the last partial FAX data Pe using the predetermined function. The first calculation unit 44 calculates a data transmission time until the last one item of partial FAX data Pe is transmitted from the start of transmission of the first one item of partial FAX data P1 using the transmission time Ts3 and Ts4, the delay time Td and Td', and the number N of packet data.

The first calculation unit 44 calculates an estimated communication time corresponding to the specific bandwidth guarantee by calculating the sum of the negotiation time and the data transmission time. As described above, the first calculation unit 44 calculates the estimated communication time so as to include a delay time, a processing time, and a negotiation time. Thus, the first calculation unit 44 can calculate the estimated communication time accurately.

Then, the second calculation unit 45 (refer to FIG. 1) calculates estimated communication charges when transmitting the specific FAX data to the multi-function device 110 according to the specific bandwidth guarantee using the estimated communication time calculated in step S86 and the first accounting information table 36 (S88). Specifically, in step S88, first, the first accounting information acquisition unit 43 acquires the rate 62 and the time unit 64, which correspond to the specific bandwidth guarantee, from the first accounting information table 36 (refer to FIG. 1). Then, the second calculation unit 45 calculates the number of time units for completing communication of the estimated communication time calculated in step S86 by dividing the estimated communication time calculated in step S86 by the acquired time unit 64 ("3 minutes"). The second calculation unit 45 calculates estimated communication charges corresponding to the specific bandwidth guarantee by multiplication of the calculated number of time units and the acquired rate 62.

Specifically, for example, when the bandwidth guarantee specified in step S84 is "1 Mbps" and the estimated communication time calculated in step S86 is "2 minutes and 50 seconds", the estimated communication charges are "22 yen (charges of the number of time units="1")". Moreover, for example, when the bandwidth guarantee specified in step S84 is "256 kbps" and the estimated communication time calculated in step S86 is "11 minutes and 20 seconds", the estimated communication charges are "24 yen (charges of the number of time units="4")".

After the estimated communication charges are calculated in step S88, the second calculation unit 45 stores the calculated estimated communication charges and the specific bandwidth guarantee in the temporary table with associating each calculated estimated communication charges with the respective specific bandwidth guarantee (S90). Then, the selection unit 42 determines whether or not the processing of steps S84 to S92 has been executed for all bandwidth guarantees (S92). If NO in step S92, the selection unit 42 returns to step S84 to specify another bandwidth guarantee and then execute processing of steps S86 to S90 again. In contrast, if YES in step S92, the process proceeds to step S94.

In step S94, the selection unit 42 selects a bandwidth guarantee corresponding to the lowest estimated communication charges by comparing three estimated communication charges corresponding to three bandwidth guarantees stored in the temporary table. Then, the selection unit 42 determines whether or not two or more bandwidth guarantees have been selected in step S94 (S96). If NO in step S96, the selection unit 42 sets the one bandwidth guarantee selected in step S94 as an acquired bandwidth guarantee and ends the bandwidth guarantee selection processing. In contrast, if YES in step S96, the selection unit 42 selects one bandwidth guarantee with the highest communication speed of the two or more bandwidth guarantees selected in step S94 (S98). Then, the selection unit 42 sets the one bandwidth guarantee selected in step S98 as an acquired bandwidth guarantee and ends the bandwidth guarantee selection processing.

As described above, the multi-function device 10 of the present exemplary embodiment can select a bandwidth guarantee with the lowest communication charges when transmitting the specific FAX data.

Figure 4:
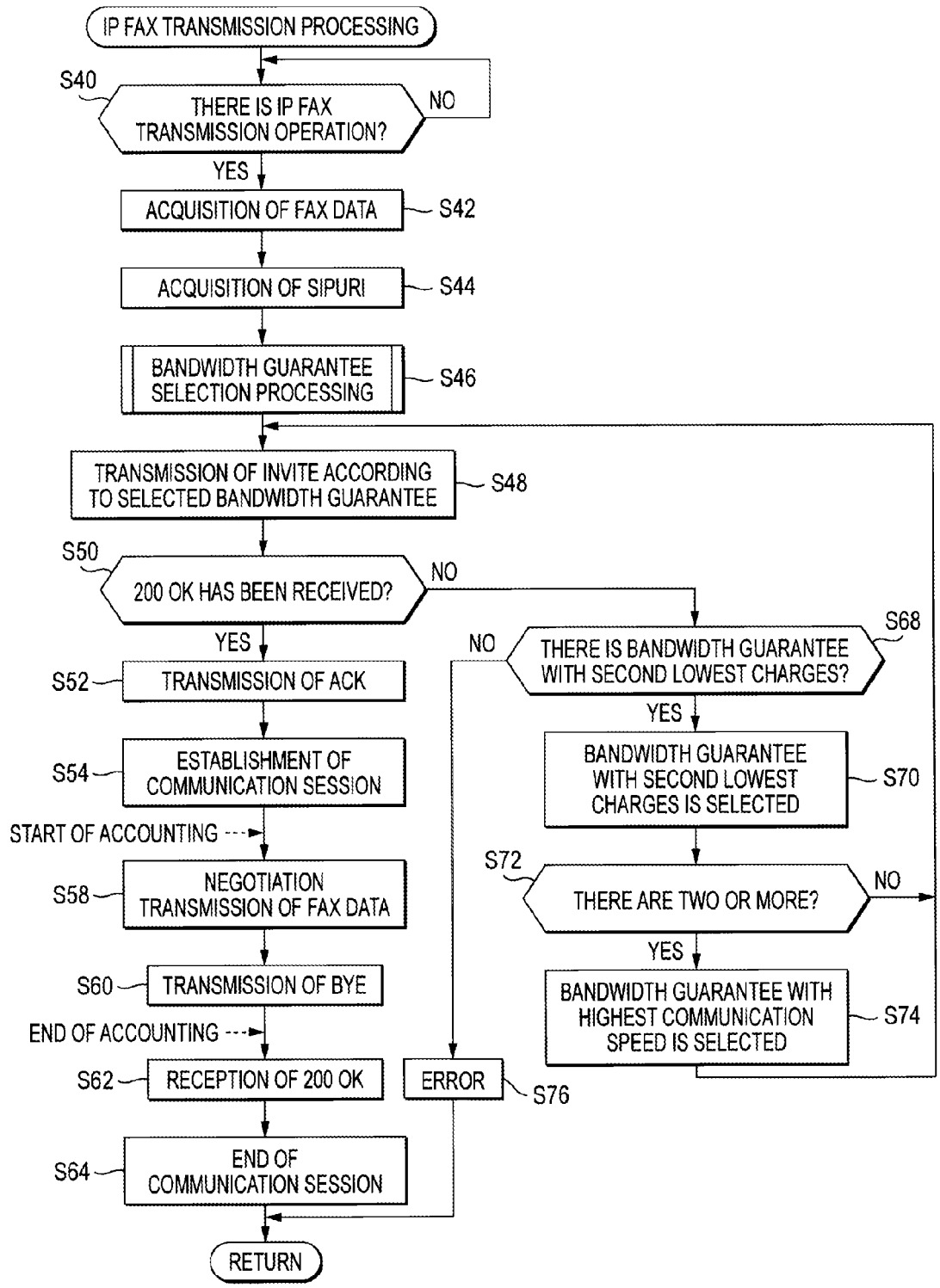
FIG. 4 shows a flow chart of IP FAX transmission processing.

After the bandwidth guarantee selection processing (refer to FIG. 5) ends, the communication unit 40 transmits INVITE to the SIP server 120 according to the bandwidth guarantee selected in the bandwidth guarantee selection processing (that is, the selected bandwidth guarantee) with the SIPURI acquired in step S44 of FIG. 4 as a transmission destination (S48). The SIP server 120 transmits INVITE to the multi-function device 110. Upon receiving INVITE, the multi-function device 110 transmits 200 OK to the SIP server 120. The SIP server 120 transmits 200 OK to the multi-function device 10.

After transmitting INVITE, the communication unit 40 monitors whether or not 200 OK has been received (S50). When the communication unit 40 receives 200 OK, the communication unit 40 performs determination of YES in step S50. If YES in step S50, the communication unit 40 transmits ACK to the SIP server 120 with the SIPURI acquired in step S44 of FIG. 4 as a transmission destination (S52). The SIP server 120 transmits ACK to the multi-function device 110. The multi-function device 110 receives ACK. As a result, a communication session is established between the multi-function devices 10 and 110 (S54). If the communication session is established, accounting is started. In the present exemplary embodiment, the SIP server 120 functions as an accounting server. Specifically, when the communication session is established in step S54, the SIP server 120 starts measurement of a communication time.

Then, the communication unit 40 executes negotiation communication with the multi-function device 110 without relaying the SIP server 120 and then transmits the specific FAX data acquired in step S42 to the multi-function device 110 through the Internet 4 (S58). The negotiation communication and the transmission of the specific FAX data are executed in the same method as in FIG. 3. After the transmission of the specific FAX data ends, the communication unit 40 transmits BYE to the SIP server 120 (S60). Upon receiving BYE, the SIP server 120 ends the accounting and transmits BYE to the multi-function device 110. When the accounting processing ends, the SIP server 120 ends measurement of a communication time taken for communication between the multi-function devices 10 and 110. The multi-function device 110 transmits 200 OK to the SIP server 120 when BYE is received. The SIP server 120 transmits 200 OK to the multi-function device 10. The communication unit 40 receives 200 OK (S62). Upon receiving 200 OK, the communication unit 40 ends the communication session between the multi-function devices 10 and 110 (S64). The SIP server 120 calculates communication charges using the measured communication time and the communication charges per time unit of the selected bandwidth guarantee. The method of calculating communication charges is the same as the method when the second calculation unit 45 calculates the estimated communication charges in step S88 of FIG. 5. The operator who manages the SIP server 120 charges the user of the multi-function device 10 the calculated charges. After the end of step S64, the communication unit 40 ends the IP FAX transmission processing.

On the other hand, for example, the multi-function device 110 at the transmission destination may not be able to execute communication according to the selected bandwidth guarantee. In such a situation, the multi-function device 110 cannot receive INVITE transmitted in step S48. As a result, the multi-function device 110 cannot transmit 200 OK. Accordingly, the communication unit 40 performs determination of NO in step S50. No in step S50 means that communication according to the selected bandwidth guarantee has failed. If No in step S50, the communication unit 40 determines whether or not a bandwidth guarantee with the second lowest communication charges is present in the temporary table (S68). When there is a bandwidth guarantee with communication charges ranked immediately lower than that of the selected bandwidth guarantee, the communication unit 40 performs determination of YES in step S68. Incidentally, also in a first case where two or more bandwidth guarantees with the lowest communication charges are selected in step S94 of FIG. 5, one of the two or more bandwidth guarantees is selected in step S98 of FIG. 5, and a bandwidth guarantee which has not yet been selected in step S70 to be described later is present in the two or more bandwidth guarantees, determination of YES is performed in step S68. In addition, also in a second case where two or more bandwidth guarantees are selected in step S70 to be described later, one of the two or more bandwidth guarantees is selected in step S74 to be described later, and a bandwidth guarantee which has not yet been selected in step S74 to be described later is present in the two or more bandwidth guarantees, determination of YES is performed in step S68.

If YES in step S68, the selection unit 42 selects the bandwidth guarantee with the second lowest communication charges (S70). Incidentally, in the above-described first case, the selection unit 42 selects a bandwidth guarantee, which has not yet been selected in step S70, of the two or more bandwidth guarantees selected in step S94 of FIG. 5. Moreover, in the above-described second case, the selection unit 42 selects a bandwidth guarantee, which has not yet been selected in step S74, of the two or more bandwidth guarantees selected in the past step 70.

Then, the selection unit 42 determines whether or not two or more bandwidth guarantees have been selected in step S70 (S72). If NO in step S72, the communication unit 40 sets the bandwidth guarantee selected in step S70 as a new selected bandwidth guarantee and returns to step S48 to transmit INVITE to the SIP server 120 according to the new selected bandwidth guarantee. In contrast, if YES in step S72, the selection unit 42 selects one bandwidth guarantee, which corresponds to the highest communication speed, of the two or more bandwidth guarantees selected in step S70 (S74). After the end of step S74, the communication unit 40 sets the bandwidth guarantee selected in step S74 as a new selected bandwidth guarantee and returns to step S48 to transmit INVITE to the SIP server 120 according to the new selected bandwidth guarantee.

Figure 5:
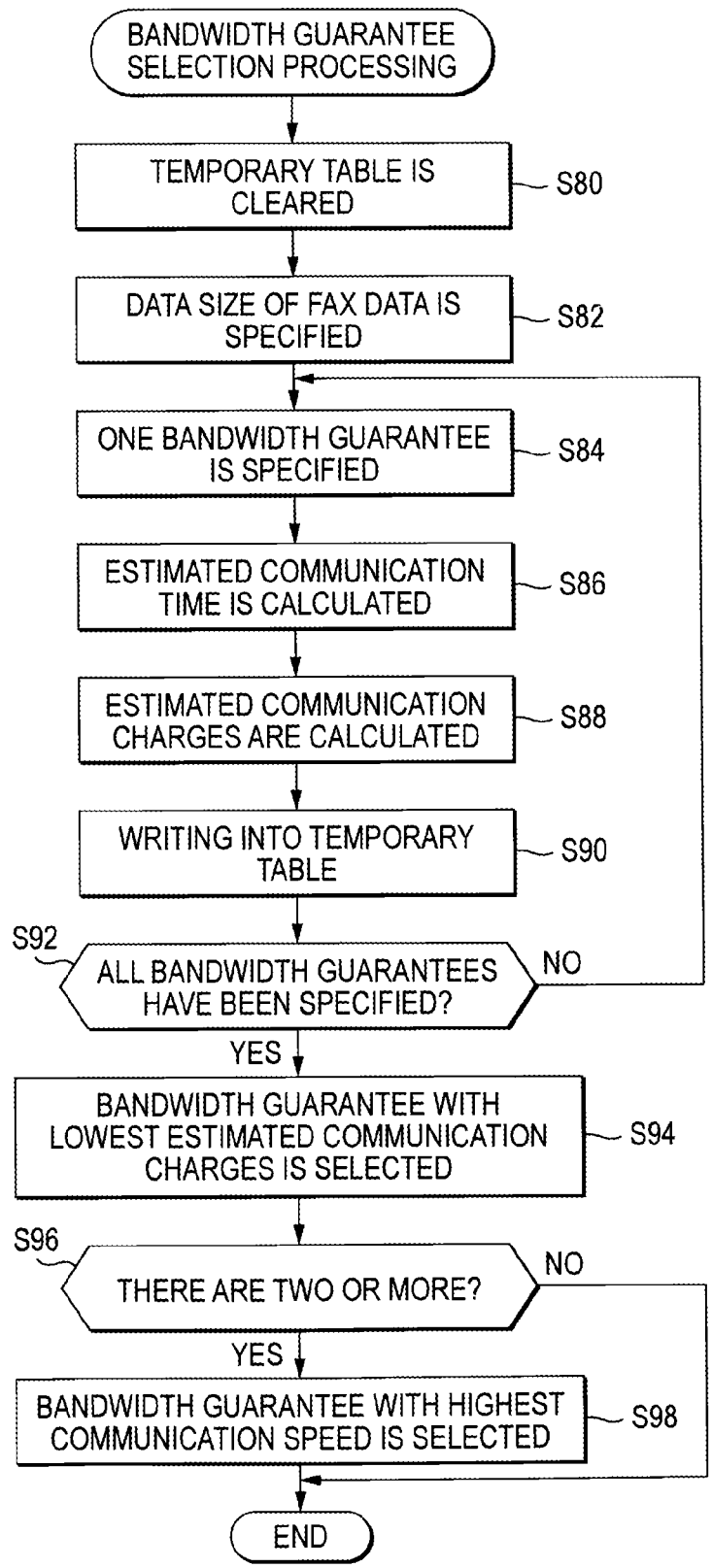
FIG. 5 shows a flow chart of bandwidth guarantee selection processing.

As described above, in the present exemplary embodiment, when communication according to the bandwidth guarantee selected in the bandwidth guarantee selection processing of FIG. 5 fails (NO in step S50 of FIG. 4), the selection unit 42 newly selects the bandwidth guarantee with the second lowest charges (S70). The communication unit 40 transmits the specific FAX data according to the newly selected bandwidth guarantee (S48). For this reason, it is possible to increase the possibility that transmission of the specific FAX data will succeed.

In contrast, if NO in step S68, the communication unit 40 executes error processing (for example, display of a character string indicating an error) (S72) and ends the IP FAX transmission processing.

Figure 6:
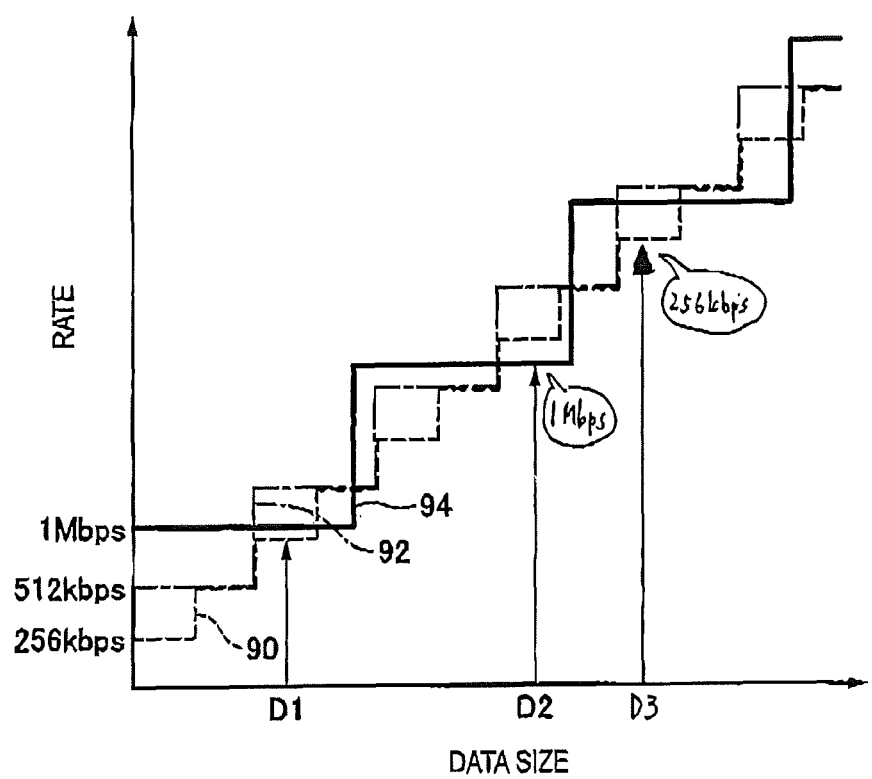
FIG. 6 shows a relationship between data size and communication charges of each bandwidth guarantee.

Until now, the communication system 2 of the present exemplary embodiment has been described. In the present exemplary embodiment, the time-based accounting system is adopted. In the time-based accounting system, accounting of communication according to each bandwidth guarantee is executed according to communication charges per time unit. The communication time of each bandwidth guarantee required for communication of FAX data depends on the data size of the FAX data. As a result, the communication charges of each bandwidth guarantee required for communication of the FAX data depend on the data size of the FAX data. Therefore, even if the multi-function device 10 executes communication of FAX data according to the bandwidth guarantee "256 kbps" with the lowest communication charges per time unit, the required communication charges are not necessarily the lowest. FIG. 6 shows the relationship between the data size and the communication charges corresponding to each bandwidth guarantee. Incidentally, reference numerals 90, 92, and 94 correspond to bandwidth guarantees "256 kbps", "512 kbps", and "1 Mbps", respectively. As is apparent from FIG. 6, for example, when the data size of the transmitted FAX data is D1, a bandwidth guarantee with the lowest communication charges required for communication of the FAX data is the bandwidth guarantee "256 kbps" with the lowest communication charges per time unit. However, when the data size of the transmitted FAX data is D2, a bandwidth guarantee with the lowest communication charges required for communication of the FAX data is not the bandwidth guarantee "256 kbps" but the bandwidth guarantee "1 Mbps".

In the present exemplary embodiment, even in the case where the time-based accounting system is adopted, the multi-function device 10 selects a bandwidth guarantee with the lowest estimated communication charges required for communication of the specific FAX data, among the three bandwidth guarantees (256 kbps, 512 kbps, and 1 Mbps), using the data size of the specific FAX data so that a bandwidth guarantee with the lowest communication charges is selected. Therefore, when the time-based accounting system is adopted, the multi-function device 10 can execute communication of the FAX data according to a bandwidth guarantee with the lowest communication charges. In addition, the multi-function device 10 selects a bandwidth guarantee with the highest communication speed when there is a plurality of bandwidth guarantees with the lowest estimated communication charges (S98 in FIG. 5). Therefore, the multi-function device 10 can execute communication according to a bandwidth guarantee with the lowest communication charges and the highest communication speed.

In the present exemplary embodiment, the multi-function device 10 calculates an estimated communication time of each bandwidth guarantee using the data size of the specific FAX data and the parameter group 38 (S86 in FIG. 5), and then calculates the estimated communication charges of each bandwidth guarantee (S88 in FIG. 5). Instead of this configuration, a first configuration may be considered in which the first information (for example, information in FIG. 6) indicating the relationship between the data size and the communication charges of each bandwidth guarantee is given to the multi-function device 10. In the first configuration, the multi-function device 10 can specify the communication charges of each bandwidth guarantee required for communication of the specific FAX data using the data size of the specific FAX data and the first information. As a result, the communication device can specify a bandwidth guarantee with the lowest communication charges. In addition, for example, a second configuration may be considered in which the second information (for example, bandwidth guarantee information in a third exemplary embodiment) indicating the relationship between the data size and a bandwidth guarantee with the lowest communication charges is given to the multi-function device 10. In the second configuration, the multi-function device 10 can specify a bandwidth guarantee with the lowest communication charges using the data size of the specific FAX data and the second information. Here, since the first and second information is information on each value of the data size, it has a huge amount of information. In order to prepare the first and second information with such a huge amount of information, a lot of effort is needed. That is, in order to adopt the first or second configuration described above, the vendor of the multi-function device 10 needs to make a lot of effort to prepare the first or second information in advance and to store it in the memory 32 of the multi-function device 10 in advance. In contrast, such an effort is not necessary in the configuration of the present exemplary embodiment. In addition, in order to adopt the above-described first or second configuration, it is necessary to store the first or second information with a huge amount of information in the memory 32. As a result, the amount of the memory 32 used becomes large. In contrast, according to the configuration of the present exemplary embodiment, the amount of the memory 32 used can be reduced.

The correspondence relationship between the configuration of the present exemplary embodiment and the configuration of the present invention will be described. The multi-function devices 10 and 110 are examples of a "communication device" and a "device which is a communication destination of specific data", respectively. The three bandwidth guarantees (256 kbps, 512 kbps, and 1 Mbps) are examples of "a plurality of bandwidth guarantees". The specific FAX data acquired in step S42 of FIG. 4 is one example of "specific data". The items of combination information 50, 52, and 54 in the first accounting information table 36 of FIG. 1 are examples of the "first accounting information". Each of the partial FAX data P1, P2, and the like is one example of a "packet with a predetermined size". The negotiation communication and the negotiation time shown in FIG. 3 are examples of "preparatory communication" and "preparatory communication time", respectively. The negotiation information N1 and N2 are examples of "specific information".

Second Exemplary Embodiment

Configuration of the Multi-Function Device 10

An explanation regarding a second exemplary embodiment will be focused on a different point from the first exemplary embodiment described above. In the second exemplary embodiment, in the memory 32 of the multi-function device 10 shown in FIG. 1, the second accounting information table 39 is stored instead of the first accounting information table 36 and the parameter group 38. In addition, the selection unit 42 includes the second accounting information acquisition unit 46 and the specification unit 47 instead of the first accounting information acquisition unit 43, the first calculation unit 44, and the second calculation unit 45.

The second accounting information table 39 is information (information in FIG. 6) indicating the relationship between the data size and the communication charges (that is, estimated communication charges) of each bandwidth guarantee. Incidentally, a function indicating the relationship between the data size and the communication charges of each bandwidth guarantee may be stored in the multi-function device 10 instead of the second accounting information table 39.

(Bandwidth Guarantee Selection Processing)

Next, bandwidth guarantee selection processing according to the second exemplary embodiment will be described. In the bandwidth guarantee selection processing of the present exemplary embodiment, the selection unit 42 executes processing described below instead of the processing in steps S86 and S88 of FIG. 5. After a bandwidth guarantee is specified in step S84, first, the second accounting information acquisition unit 46 (refer to FIG. 1) acquires the accounting information (any information denoted by the reference numerals 90, 92, and 94 in FIG. 6), which corresponds to the bandwidth guarantee (the above-described specific bandwidth guarantee) specified in step S84, from the second accounting information table 39. Then, the specification unit 47 (refer to FIG. 1) specifies estimated communication charges, which are required when transmitting the specific FAX data according to the specific bandwidth guarantee, using the data size specified in step S82 and the accounting information acquired in step S86. The specification unit 47 stores the specified estimated communication charges and the specific bandwidth guarantee in the temporary table with associating each specified estimated communication charges with the respective specific bandwidth guarantee (S90). Each processing from step S92 is the same as that in the first exemplary embodiment.

In the second exemplary embodiment, the specification unit 47 can specify the estimated communication charges using the second accounting information table 39 and the data size of the specific FAX data. Accordingly, the multi-function device 10 can specify the estimated communication charges quickly compared with the configuration (for example, the configuration of the first exemplary embodiment) of calculating the estimated communication charges. Incidentally, in the second exemplary embodiment, the items of information 50, 52, and 54 in the second accounting information table 39 are examples of the "second accounting information".

Third Exemplary Embodiment (Configuration of the Multi-Function Device 10)

An explanation regarding a third exemplary embodiment will be focused on a different point from the first exemplary embodiment. In the third exemplary embodiment, in the memory 32 of the multi-function device 10 shown in FIG. 1, a bandwidth guarantee information table (not shown) is stored instead of the first accounting information table 36 and the parameter group 38. The bandwidth guarantee information table is a table in which the data size and a bandwidth guarantee with the lowest communication charges are associated with each other. For example, in the bandwidth guarantee information table, the information indicating the bandwidth guarantee "256 kbps" is associated with the data size D1 (refer to FIG. 6), and the information indicating the bandwidth guarantee "1 Mbps" is associated with the data size D2 (refer to FIG. 6). In the bandwidth guarantee information table, the information indicating a bandwidth guarantee with the lowest communication charges is associated with each of other data sizes.

(Bandwidth Guarantee Selection Processing)

In the third exemplary embodiment, the selection unit 42 executes processing described below instead of the processing in steps S84 to S98 of FIG. 5. After the data size of the specific FAX data is specified in step S82, the selection unit 42 selects a bandwidth guarantee with the lowest communication charges, which are required when transmitting the specific FAX data, using the data size specified in step S82 and the bandwidth guarantee information table. Specifically, the selection unit 42 selects a bandwidth guarantee, which is associated with the data size specified in step S82, from the bandwidth guarantee information table. After the selection unit 42 selects the bandwidth guarantee, the bandwidth guarantee selection processing ends.

In the third exemplary embodiment, the multi-function device 10 can select a bandwidth guarantee with the lowest communication charges using the bandwidth guarantee information table and the data size of the specific FAX data. Accordingly, the multi-function device 10 can specify the estimated communication charges quickly compared with the configuration (for example, the configuration of the first exemplary embodiment) of calculating the estimated communication charges. In addition, the multi-function device 10 can select a bandwidth guarantee with the lowest communication charges quickly compared with the configuration (for example, the configuration of the second exemplary embodiment) using the information indicating the relationship between the data size and the communication charges of each bandwidth guarantee. This is because it is not necessary to select a bandwidth guarantee with the lowest communication charges by comparing a plurality of estimated communication charges corresponding to a plurality of bandwidth guarantees.

Fourth Exemplary Embodiment

In the first exemplary embodiment, the first accounting information table 36 is stored in the memory 32 by the vendor of the multi-function device 10 before shipping of the multi-function device 10, and the stored first accounting information table 36 is not changed later. In a fourth exemplary embodiment, however, the first accounting information acquisition unit 43 acquires the first accounting information table 36 from an external server (not shown), which stores a latest first accounting information table, whenever an IP FAX transmission operation is executed. The selection unit 42 executes the bandwidth guarantee selection processing in FIG. 5 using the acquired first accounting information table 36. Incidentally, in the fourth exemplary embodiment, the acquired first accounting information table 36 is stored in a temporary storage region (for example, a VRAM) of the memory 32. In the fourth exemplary embodiment, the first accounting information acquisition unit 43 acquires the first accounting information table 36 from an external server. Therefore, when the old first accounting information table 36 is updated to the new first accounting information table 36, the first accounting information acquisition unit 43 can acquire the new first accounting information table 36 from the external server.

Modifications to the Exemplary Embodiments

Modifications to the above-described exemplary embodiments will be described below.

(1) The processing time Tp may differ with each device at the communication destination of the multi-function device 10. In this case, for example, SIPURI of the device at the communication destination, with which the multi-function device 10 executes communication, and the processing time of the device at the communication destination may be stored in a memory with associating the SIPURI of the device at the communication destination with the processing time of the device at the communication destination.

(2) The multi-function device 10 may execute various kind of communication such as e-mail transmission processing for the multi-function device 110. For example, in the email transmission processing or the like, the communication unit 40 may transmit an email according to a bandwidth guarantee selected by the bandwidth guarantee selection processing (refer to FIG. 5). In the case of executing any communication in which the data size of transmitted data is set in advance, the communication unit 40 may execute the communication according to a bandwidth guarantee selected in bandwidth guarantee selection processing.

(3) The time unit may differ with each bandwidth guarantee. Accordingly, for example, the communication charges per time unit "1 minute" of the bandwidth guarantee "512 kbps" may be "4 yen".

(4) The negotiation time may not be used when calculating the estimated communication time. This is because the negotiation time is shorter than the data transmission time in actual communication. That is, the first calculation unit 44 may calculate a data transmission time as an estimated communication time. In this case, the information (D1, D2) regarding the data size of negotiation information may not be included in the parameter group 38.

(5) In the first exemplary embodiment, the memory 32 of the multi-function device 10 may store the time information, which indicates the relationship between the data size of FAX data and an estimated communication time corresponding to each bandwidth guarantee, instead of the parameter group 38. In this case, in the bandwidth guarantee selection processing, the selection unit 42 may specify an estimated communication time when transmitting the specific FAX data to the multi-function device 110 according to the specific bandwidth guarantee, using the data size of the specific FAX data and the time information instead of the processing in step S86 of FIG. 5. In this case, processing from step S88 is the same as in the first exemplary embodiment. This modification is also included in the configuration called a "selection unit that selects a first bandwidth guarantee using the data size of the specific data".

(6) In the first exemplary embodiment, for communication of partial FAX data performed from the second second, the first calculation unit 44 may calculate a time required for the communication of the partial FAX data from the second second by calculating the number of packets of the partial FAX data, which can be transmitted for one second, and dividing the number of packets of the remaining partial FAX data by the number of packets of the partial FAX data which can be transmitted for one second. In addition, for communication of partial FAX data performed from the second second, the first calculation unit 44 may calculate a time required for the communication of the partial FAX data from the second second by calculating the data size (for example, 256 kilobit in the case of the bandwidth guarantee "256 kbps") of data, which can be transmitted for one second in a specific bandwidth guarantee, and dividing the data size of the remaining FAX data by the calculated data size. Using these methods, the first calculation unit 44 can calculate a time required for communication of partial FAX data from the second second without calculating the delay time Td'.

(7) In the case of receiving the data transmitted from the multi-function device 110, the communication unit 40 of the multi-function device 10 may be made to receive the data (for example, FAX data or email) according to a bandwidth guarantee selected by the bandwidth guarantee selection processing (refer to FIG. 5). This modification is also included in the configuration called a "data communication".

(8) The partial FAX data may be generated to have a predetermined size according to the data size of FAX data. In this case, FAX data may be divided such that partial FAX data obtained by dividing the same FAX data has different data sizes. In this case, the partial data size D3 is not stored in the parameter group 38, and processing for calculating the data size of partial FAX data is included in the bandwidth guarantee selection processing. In addition, it is preferable that the number of partial FAX data which can be transmitted per time unit is specified from the data size of the partial FAX data specified for every specified partial FAX data. In addition, the delay time Td (Td') according to a bandwidth guarantee may be set before transmission of each item of partial FAX data. Preferably, the estimated communication time of FAX data is calculated from the delay time and the transmission time when transmitting the partial FAX data which can be transmitted per time unit.

(9) The multi-function device 10 may store in advance the time Ts1, Ts2, and Td taken for negotiation communication and the time Ts3 taken for transmission of one item of partial FAX data, and calculate a delay time from the stored time and the data size of FAX data to be transmitted.

While the specific examples of the present invention have been described in detail, these are for illustrative purposes and are not intended to limit the scope of the present invention defined in the appended claims. Various modifications and changes of the specific examples illustrated above are included in the techniques defined in the appended claims.

In addition, technical elements described in this specification or drawings are technically useful independently or in various combinations and are not limited to combinations defined in the appended claims. In addition, the techniques illustrated in this specification or drawings are proposed to achieve a plurality of objects simultaneously, and the technical availability is obtained by achieving one of them.

According to another illustrative aspect of the invention, in the communication device, the selection unit comprises: a first accounting information acquisition unit that is configured to acquire, for each of the plurality of bandwidth guarantees, first accounting information indicating communication charges per time unit corresponding to the bandwidth guarantee; a first calculation unit that is configured to calculate, for each of the plurality of bandwidth guarantees, an estimated communication time, which is required when the communication of the specific data is executed according to the bandwidth guarantee, using the data size of the specific data; and a second calculation unit that is configured to calculate, for each of the plurality of bandwidth guarantees, estimated communication charges, which are required when the communication of the specific data is executed according to the bandwidth guarantee, using the estimated communication time calculated for the bandwidth guarantee and the first accounting information corresponding to the bandwidth guarantee, wherein the selection unit selects the first bandwidth guarantee corresponding to the lowest estimated communication charges among a plurality of estimated communication charges calculated for the plurality of bandwidth guarantees.

According thereto, the communication device calculates a plurality of estimated communication charges corresponding to the plurality of bandwidth guarantees using the data size of the specific data. Therefore, for example, a vendor of the communication device does not need to prepare in advance the information indicating the relationship between the data size and the communication charges, the information indicating the relationship between the data size and a bandwidth guarantee with the lowest communication charges, and the like.

According to still another illustrative aspect of the invention, in the communication device, the first accounting information acquisition unit acquires a plurality of the first accounting information corresponding to the plurality of bandwidth guarantees from an external device.

According thereto, when the old first accounting information is updated to the new first accounting information, the first accounting information acquisition unit can acquire the new first accounting information from an external server.

According to still another illustrative aspect of the invention, in the communication device, the first calculation unit calculates, for each of the plurality of bandwidth guarantees, the estimated communication time corresponding to the bandwidth guarantee such that the estimated communication time corresponding to the bandwidth guarantee includes a delay time occurring whenever communication of a packet with a predetermined size is executed according to the bandwidth guarantee. Further, in the communication device, the first calculation unit calculates, for each of the plurality of bandwidth guarantees, the estimated communication time corresponding to the bandwidth guarantee such that the estimated communication time corresponding to the bandwidth guarantee includes a processing time of a device which is a communication destination of the specific data, wherein the processing time of the device includes a time required for the device to generate a response to a predetermined packet from the communication device.

According thereto, the estimated communication time is calculated so as to include at least one of the delay time, the processing time, and the preparatory communication time. Therefore, the communication device can calculate the estimated communication time accurately.

According to still another illustrative aspect of the invention, in the communication device, the first calculation unit calculates, for each of the plurality of bandwidth guarantees, the estimated communication time corresponding to the bandwidth guarantee such that the estimated communication time corresponding to the bandwidth guarantee includes a preparatory communication time for preparatory communication executed according to the bandwidth guarantee, wherein the preparatory communication includes communication of specific information, which is required for the communication of the specific data, between the communication device and a device, which is a communication destination of the specific data, before the communication of the specific data is started.

According thereto, the communication device does not need to calculate the estimated communication charges using the data size of the specific data. As a result, the communication device can specify the estimated communication charges quickly compared with the configuration of calculating the estimated communication charges.

According to still another illustrative aspect of the invention, in the communication device, the selection unit comprises: a second accounting information acquisition unit that is configured to acquire, for each of the plurality of bandwidth guarantees, second accounting information corresponding to the bandwidth guarantee which indicates the relationship between the data size and communication charges; and a specification unit that is configured to specify, for each of the plurality of bandwidth guarantees, estimated communication charges, which are required when the communication of the specific data is executed according to the bandwidth guarantee, using the data size of the specific data and the second accounting information, wherein the selection unit selects the first bandwidth guarantee corresponding to lowest estimated communication charges among a plurality of estimated communication charges specified for the plurality of bandwidth guarantees.

According thereto, when the time-based accounting system is adopted, the communication device can execute communication according to the bandwidth guarantee with the lowest communication charges and the highest communication speed.

According to still another illustrative aspect of the invention, in the communication device, when two or more bandwidth guarantees with the lowest communication charges required for the communication of the specific data are present in the plurality of bandwidth guarantees, the selection unit selects the first bandwidth guarantee with the highest communication speed from the two or more bandwidth guarantees.

According thereto, it is possible to increase the possibility that communication of the specific data will succeed.

What is claimed is:

1. A communication device comprising:
    a communication unit that is configured to control a scan execution unit to generate scan data, and to execute communication of the scan data according to one of a plurality of bandwidth guarantees, each having a different communication charge per time unit required for communication of the scan data;
    a selection unit comprising:
        a first accounting information acquisition unit that is configured to acquire, for each of the plurality of bandwidth guarantees, first accounting information indicating the communication charge per time unit corresponding to the bandwidth guarantee, the plurality of bandwidth guarantees comprising:
            a first bandwidth guarantee having a first communication charge per time unit; and
            a second bandwidth guarantee having a second communication charge, which is higher than the first communication charge, per time unit;
        a first calculation unit that is configured to calculate, for each of the plurality of bandwidth guarantees, an estimated communication time, which is required when the communication of the scan data is executed according to each of the bandwidth guarantee, using a data size of specific scan data to be communicated, such that the estimated communication time corresponding to the bandwidth guarantee includes at least one of:
            a delay time occurring whenever communication of a packet with a predetermined size is executed according to the bandwidth guarantee;
            a processing time of a device which is a communication destination of the specific scan data, the processing time of the device including a time required for the device to generate a response to a predetermined packet from the communication device; and
            a preparatory communication time for preparatory communication executed according to the bandwidth guarantee, the preparatory communication including communication of specific information, which is required for the communication of the specific scan data, between the communication device and a device, which is a communication destination of the specific scan data, before the communication of the specific scan data is started;
        a second calculation unit that is configured to calculate, for each of the plurality of bandwidth guarantees, an estimated communication charge, which is required when the communication of the specific scan data is executed according to each of the bandwidth guarantees, using the estimated communication time calculated for each of the bandwidth guarantee using the data size of the specific scan data and the first accounting information corresponding to each of the bandwidth guarantee; and
        a determination unit configured to determine the lowest estimated communication charge required for the communication of the specific scan data in accordance with the calculation by the second calculation unit,
    wherein the selection unit is configured to, before executing communication of the scan data, select one bandwidth guarantee of the plurality of bandwidth guarantees corresponding to the determined lowest estimated communication charge, the one selected bandwidth guarantee being one of the first bandwidth guarantee and the second bandwidth guarantee,
    wherein the communication of the specific scan data is executed according to the selected bandwidth guarantee.

2. The communication device according to claim 1, wherein the first accounting information acquisition unit acquires a plurality of the first accounting information corresponding to the plurality of bandwidth guarantees from an external device.

3. The communication device according to claim 1, wherein when two or more bandwidth guarantees with the lowest communication charges required for the communication of the specific scan data are present in the plurality of bandwidth guarantees, the selection unit selects the first bandwidth guarantee with the highest communication speed from the two or more bandwidth guarantees.

4. The communication device according to claim 1, wherein when the communication of the specific scan data fails as a result after the communication unit executes the communication of the specific scan data according to the selected first bandwidth guarantee, the selection unit selects a second bandwidth guarantee with the second lowest communication charges required for the communication of the specific scan data among the plurality of bandwidth guarantees, and
wherein the communication unit executes the communication of the specific scan data according to the selected second bandwidth guarantee.

5. A communication device comprising:
a controller; and
a memory that stores a program including instructions to be executed by the controller, wherein the instructions, when executed by the controller, cause the controller to function as:
    a communication unit that is configured to control a scan execution unit to generate scan data, and to execute communication of the scan data according to one of a plurality of bandwidth guarantees, each having a different communication charge per time unit required for communication of the scan data; and a selection unit that is configured to select a bandwidth guarantee with the lowest communication charge required for communication of specific scan data to be communicated, among the plurality of bandwidth guarantees, the selection using a data size of the specific scan data to be communicated when the communication of the specific scan data is to be executed;

wherein the selection unit comprises:

a first accounting information acquisition unit that is configured to acquire, for each of the plurality of bandwidth guarantees, first accounting information indicating the communication charge per time unit corresponding to the bandwidth guarantee, a first calculation unit that is configured to calculate, for each of the plurality of bandwidth guarantees, an estimated communication time, which is required when the communication of the scan data is executed according to each of the bandwidth guarantee, using a data size of specific scan data to be communicated, such that the estimated communication time corresponding to the bandwidth guarantee includes at least one of:

a delay time occurring whenever communication of a packet with a predetermined size is executed according to the bandwidth guarantee;

a processing time of a device which is a communication destination of the specific scan data, the processing time of the device including a time required for the device to generate a response a predetermined packet from the communication device; and a preparatory communication time for preparatory communication executed according to the bandwidth guarantee, the preparatory communication including communication of specific information, which is required for the communication of the specific scan data, between the communication device and a device, which is a communication destination of the specific scan data, before the communication of the specific scan data is started;

a second calculation unit that is configured to calculate, for each of the plurality of bandwidth guarantees, an estimated communication charge, which is required when the communication of the specific scan data is executed according to each of the bandwidth guarantees, using the estimated communication time calculated for each of the bandwidth guarantee using the data size of the specific scan data and the first accounting information corresponding to each of the bandwidth guarantee a second accounting information acquisition unit that is configured to acquire, for each of the plurality of bandwidth guarantees, second accounting information corresponding to the bandwidth guarantee which indicates the relationship between the data size and communication charges;

a specification unit that is configured to specify, for each of the plurality of bandwidth guarantees, estimated communication charges, which are required when the communication of the specific data is executed according to the bandwidth guarantee, using the data size of the specific scan data and the second accounting information; and a determination unit configured to determine the lowest estimated communication charge required for the communication of the specific scan data in accordance with the calculation by the second calculation unit, wherein the second accounting information includes an information about relationship between a size of the scan data and a bandwidth guarantee with the lowest communication charge, the bandwidth guarantee with the lowest communication charge relying on the estimated communication time to communicate the scan data, and wherein the selection unit selects the first bandwidth guarantee corresponding to lowest estimated communication charges among a plurality of estimated communication charges specified for the plurality of bandwidth guarantees.

6. A communication device for a network adopting a time-based accounting system, in which accounting of communication according to each bandwidth guarantee is executed according to communication charges per time unit, the communication device comprising:

a controller; and a memory that stores a program including instructions to be executed by the controller, wherein the instructions, when executed by the controller, cause the controller to function as:

a communication unit that is configured to control a scan execution unit to generate scan data, and to execute communication of the scan data according to one of a plurality of bandwidth guarantees, each having a different communication charge per time unit required for communication of the scan data; and a selection unit comprising, a first accounting information acquisition unit that is configured to acquire, for each of the plurality of bandwidth guarantees, first accounting information indicating the communication charge per time unit corresponding to the bandwidth guarantee, the plurality of bandwidth guarantees comprising:

a first bandwidth guarantee having a first communication charge per time unit; and a second bandwidth guarantee having a second communication charge, which is higher than the first communication charge, per time unit;

a first calculation unit that is configured to calculate, for each of the plurality of bandwidth guarantees, an estimated communication time, which is required when the communication of the scan data is executed according to each of the bandwidth guarantee, using a data size of specific scan data to be communicated, such that the estimated communication time corresponding to the bandwidth guarantee includes at least one of:

a delay time occurring whenever communication of a packet with a predetermined size is executed according to the bandwidth guarantee;

a processing time of a device which is a communication destination of the specific scan data, the processing time of the device including a time required for the device to generate a response a predetermined packet from the communication device; and a preparatory communication time for preparatory communication executed according to the bandwidth guarantee, the preparatory communication including communication of specific information, which is required for the communication of the specific scan data, between the communication device and a device, which is a communication destination of the specific scan data, before the communication of the specific scan data is started;

a second calculation unit that is configured to calculate, for each of the plurality of bandwidth guarantees, an estimated communication charge, which is required when the communication of the specific scan data is executed according to each of the bandwidth guarantees, using the estimated communication time calculated for each of the bandwidth guarantees using the data size of the specific scan data and the first accounting information corresponding to each of the bandwidth guarantee; and a determination unit configured to determine the lowest estimated communication charge required for the communication of the specific scan data in accordance with the calculation by the second calculation unit, wherein the selection unit is configured to, before executing communication of the scan data, select one bandwidth guarantee of the plurality of bandwidth guarantees corresponding to the determined lowest estimated communication charge, the one selected bandwidth guarantee being one of the first bandwidth guarantee and the second bandwidth guarantee, wherein the communication of the specific scan data is executed according to the selected bandwidth guarantee.

7. A non-transitory computer-readable medium having a computer program stored thereon and is readable by a computer provided in a communication device, said computer program, when executed by the computer, causes the computer to perform operations comprising:

communication processing for executing communication of scan data according to one of a plurality of bandwidth guarantees, each having a different communication charge per time unit required for communication of the scan data; and selection processing comprising, acquiring, for each of the plurality of bandwidth guarantees, first accounting information indicating the communication charge per time unit corresponding to the bandwidth guarantee, comprising:
 a first bandwidth guarantee having a first communication charge per time unit; and
 a second bandwidth guarantee having a second communication charge, which is higher than the first communication charge, per time unit, calculating, for each of the plurality of bandwidth guarantees, an estimated communication time, which is required when the communication of the scan data is executed according to each of the bandwidth guarantee, using a data size of specific scan data to be communicated, such that the estimated communication time corresponding to the bandwidth guarantee includes at least one of:
 a delay time occurring whenever communication of a packet with a predetermined size is executed according to the bandwidth guarantee;
 a processing time of a device which is a communication destination of the specific scan data, the processing time of the device including a time required for the device to generate a response a predetermined packet from the communication device; and
 a preparatory communication time for preparatory communication executed according to the bandwidth guarantee, the preparatory communication including communication of specific information, which is required for the communication of the specific scan data, between the communication device and a device, which is a communication destination of the specific scan data, before the communication of the specific scan data is started;

calculating, for each of the plurality of bandwidth guarantees, estimated communication charge, which is required when the communication of the specific scan data is executed according to each of the bandwidth guarantees, using the estimated communication time calculated for each of the bandwidth guarantee using the data size of the specific scan data and the first accounting information corresponding to each of the bandwidth guarantee; and determining the lowest estimated communication charge required for the communication of the specific scan data in accordance with the calculation by the second calculation unit, wherein, before executing communication of the scan data, select one bandwidth guarantee of the plurality of bandwidth guarantees corresponding to the determined lowest estimated communication charge, the one selected bandwidth guarantee being one of the first bandwidth guarantee and the second bandwidth guarantee, wherein the communication of the specific scan data is executed according to the selected bandwidth guarantee.

* * * * *